United States Patent [19]
Budig et al.

[11] Patent Number: 5,277,353
[45] Date of Patent: Jan. 11, 1994

[54] STUD WELDING DEVICE

[75] Inventors: Peter K. Budig, Chemnitz; Klaus G. Schmitt, Giessen; Harald Knetsch, Herborn, all of Fed. Rep. of Germany

[73] Assignee: Emhart Inc., Newark, Del.

[21] Appl. No.: 975,934

[22] PCT Filed: Jun. 22, 1992

[86] PCT No.: PCT/GB92/01132
§ 371 Date: Feb. 24, 1993
§ 102(e) Date: Feb. 24, 1993

[87] PCT Pub. No.: WO93/00197
PCT Pub. Date: Jan. 7, 1993

[30] Foreign Application Priority Data
Jun. 24, 1991 [DE] Fed. Rep. of Germany ....... 4120811

[51] Int. Cl.5 ............................................. B23K 9/20
[52] U.S. Cl. ......................................... 228/4.1; 219/98
[58] Field of Search ...................... 228/4.1; 219/98, 99

[56] References Cited

U.S. PATENT DOCUMENTS 4,797,529 1/1989 Schmitt et al. .................... 219/98 X
5,171,959 12/1992 Schmitt et al. ......................... 219/98

FOREIGN PATENT DOCUMENTS 3620472 1/1987 Fed. Rep. of Germany .

Primary Examiner—Kenneth J. Ramsey
Attorney, Agent, or Firm—Edward D. Murphy

[57] ABSTRACT

A stud welding device comprises a stud holder and a movable member which moves the stud holder to carry a stud into position for welding. The movable member is provided by the stator or the armature of a helical thread reluctance motor.

6 Claims, 2 Drawing Sheets

STUD WELDING DEVICE

The invention relates to a stud welding device with an adjustable linear motor as regulating member for the axial displacement of a setting element of which the movement is transmitted to a stud holder, The principle of a stud welding device of this type is mentioned in DE-PS 32 15 453. The patent refers to the use of a dynamo-electrical linear motor as regulating member (see claim 9) which is to be adjustable with respect to the setting path and the setting speed. With respect to the adjustability of the setting path, only a path measuring device scanning the setting path is mentioned in this connection which can be interpreted that signals can be derived from the path measuring device, which signals indicate the respective position of the setting element so that the setting path covered in each case is dependent on the signals from the path measuring device.

In the above-mentioned patent, a rotating step switching motor is mentioned as a regulating member (see claim 5) which would allow setting of the setting element with stud holder without a path measuring device as the step switching motor can be adjusted digitally into any desired rotational position. In order to transmit the rotation of the step switching motor into linear movement, however, intermediate gearing is required, as disclosed in the patent in the form of a nut and a spindle which is moved therein.

Other regulating members for the controlled adjustment of the position and movement of the setting element with stud holder of stud welding devices have not been considered hitherto.

The object of the invention is to provide a stud welding device of the type mentioned at the outset which manages without intermediate gearing, allows direct adjustment of the position and movement of the setting element and is distinguished by a compact construction. Accordingly, the invention, provides a stud welding device comprising a stud holder and a movable member which moves the stud holder axially to carry a stud into position for welding, in which the movable element is moved by an adjustable linear motor characterized in that the adjustable linear motor is a helical thread reluctance motor having an armature and a stator the movable element is provided by one of the armature and the stator the other of the armature and the stator provides a stationary member of the device, and the linear motor and the stud holder are rotationally symmetrical.

Helical thread reluctance motors (SGRM) are known which provide a settable linear motor; such a motor is described in Proc. IEEE, volume 118 (1971) pages 1575–1580. The motor described in this document is controlled by a three-phase voltage with mains frequency by means of which a corresponding rotating field is produced. Furthermore, it is known from DE-OS 36 20 472 also to control the SGRM with a frequency-variable m-phase voltage, including the frequency zero, several direct current voltages instantaneously occurring in the latter case and keeping the moved member of the SGRM in the respective set position attained.

The invention is based on the fact that the SGRM is located in a particularly advantageous manner in a stud welding device as a regulating member for the stud holder of a stud welding device if the setting element displacing the stud holder is formed directly by the movable member of the SGRM. This construction advantageously utilises the design of the SGRM because the movable and stationary members are inserted rotationally symmetrically into one another therewith so that the movable member can carry the stud holder directly while the stationary member forms the mounting of the stud welding device. The movable and stationary members of the SGRM are therefore arranged directly behind the stud holder so that there is no additional space requirement in the longitudinal direction of the stud welding device for mounting the regulating member for the stud holder, as is the case, for example, when using the rotating step switching motor mentioned in DE-PS 32 15 453. Overall, the direct connection of the movable member, forming the regulating element, of the SGRM to the stud holder results in a short compact construction which allows the movement of the setting element displacing the stud holder with high accuracy and such forces that setting speeds of up to 1 m/sec are attainable. The digitally occurring selective adjustment of the SGRM in both axial setting directions also allows the stud holder to be moved to and from the workpiece at a controlled speed by using known electronic control means in order thus to strike an arc with a clamped weld stud, to maintain the arc for a sufficient duration and then to allow the stud to dip into the melt produced on the workpiece at a controlled speed. The SGRM allows accuracy of adjustment of 10 $\mu$m per step without difficulty, and this is more than sufficient for the accuracy of adjustment of the stud welding device.

The SGRM allows the movable member forming the setting element either to be provided by the armature arranged inside the stator and designed in the manner of a plunger, in which case the stator of the SGRM is stationary and can provide a mounting for the device, or allows the movable member to be provided by the stator of the SGRM, in which case the armature is stationary and can provide a mounting at the side of the armature remote from the stud holder. The desired compact construction of the stud welding device is achieved in both cases as the movable member is capable of carrying the stud holder in a rotationally symmetrical construction in both cases regardless of whether the armature of the stator of the SGRM is concerned.

The armature is expediently constructed as a hollow shaft so that it is possible to supply, for example, weld studs, compressed air or protective gas through the hollow shaft. The utilisation of the hollow shaft is independent of whether the armature is used as a movable or stationary member.

As already mentioned above, the SGRM affords the possibility of holding its movable member in any desired position, for which purpose, however, a certain amount of electrical energy should be applied. This energy which is to be applied in the rest position can be avoided if the movable member, in its rest position, is urged by a spring against a stop connected to the mounting. With this design, the movable member (either the armature or the stator of the SGRM) invariably adopts, under the action of the spring, a position defined by the stop in which the movable member remains without consumption of electrical energy. Only by the control of the SGRM is the movable member and therefore the setting element moved from this rest position toward the workpiece to be provided with a weld stud, the movable member and the setting element then being returned into their rest positions after striking of the welding arc and expiry of the welding process, whereupon the movable member can remain in its rest position without consuming energy under the action of the spring until the next welding operation.

It will be understood that the stud welding device may be secured by mounting the stationary member on a fixed support: alternatively the stud welding device may be a portable tool, in which case the stationary member is connected to a spacing attachment by which the device may be properly located with respect to a workpiece.

Embodiments of the invention are illustrated in the drawings.

Figure 1:
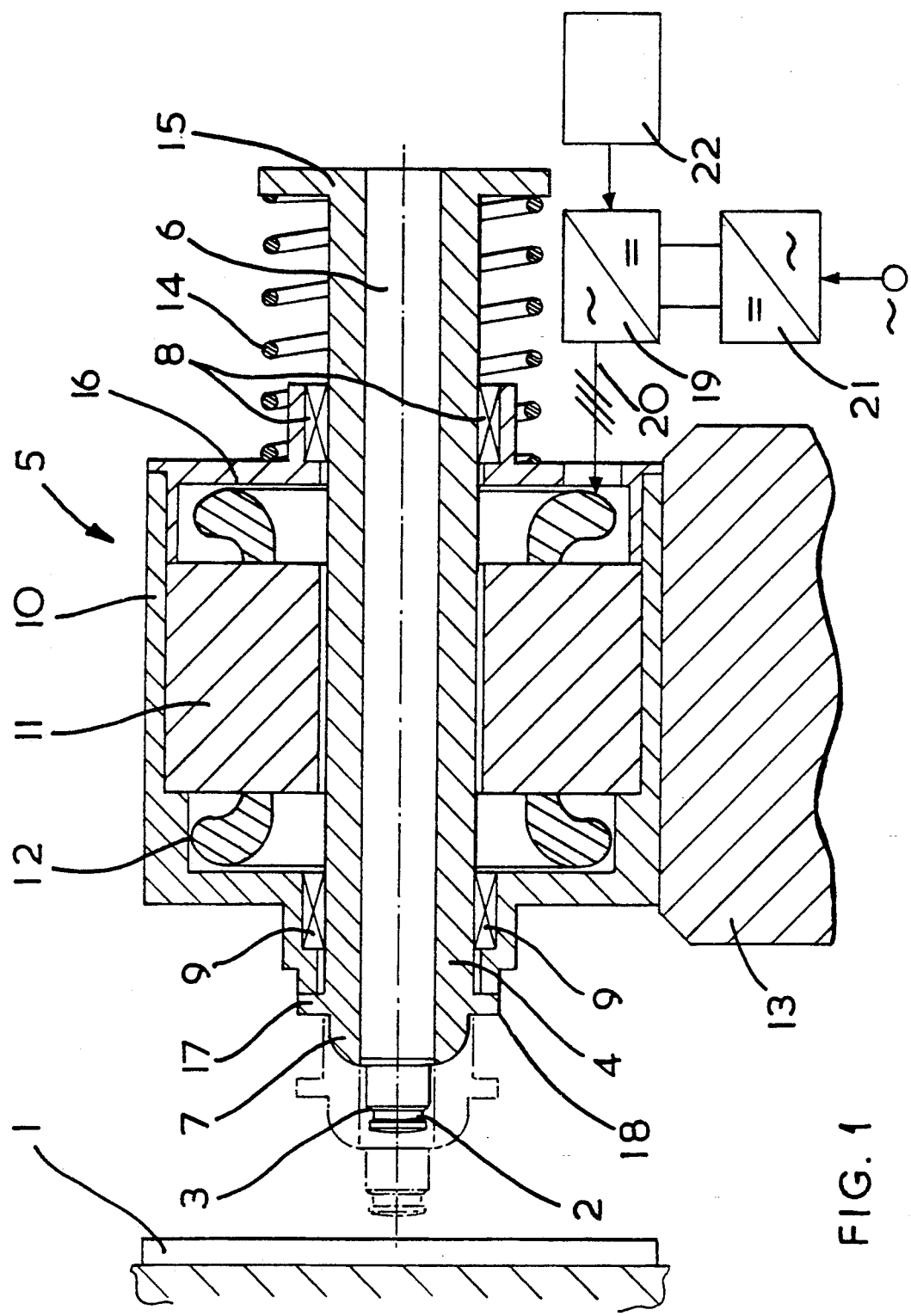
FIG. 1 shows diagrammatically a stud welding device utilizing a SGRM, with an armature forming a moving member of the device.

FIG. 1 shows a workpiece 1, for example a metal plate, on which a weld stud 2 is to be fastened by arc welding. The weld stud 2 is inserted into a stud holder 3 of a stud welding device and is held by it. The stud holder 3 is carried by a movable member provided by an armature 4 of a helical thread reluctance motor (SGRM) 5 which is constructed here as a continuous hollow shaft with a bore 6. The armature 4 passes on its side facing the workpiece 1 into a receiving member 7 in which the stud holder 3 is mounted. The stud holder 3 is actuated in a known manner, for example by drawing together clamping jaws contained in the stud holder 3. This construction is not described in detail in this connection as it pertains to the prior art.

The armature 4 is mounted via axial bearings 8 and 9 in a housing 10 which surrounding a stator 11 of the SGRM. The stator 11 contains windings 12 which are indicated schematically here and are supplied with a polyphase current via an electric control system described hereinafter. The housing 10 with the stator 11 is fastened on a support 13 which gives the stud welding device its defined position so that the stator 11 acts as a mounting for the stud welding device.

In the embodiment shown in FIG. 1, the armature 4 provides a movable member of SGRM, i.e. a setting element for the stud holder 3. The stator provides a stationary member of the SGRM, i.e. a mounting for the stud welding device. It can be seen that the linear motor 5 and the stud holder 3 are rotationally symmetrical, and thus convenient for access to a workpiece.

The stud welding device is shown in its rest position in FIG. 1, in which a compression spring 14 which acts between a flange 15 of the armature 4 and a radial wall 16 of the housing 10. Towards the end of the armature 4 remote from the flange 15, the armature 4 is provided with a stop plate 17 which is urged by the spring 14, against an end face 18 of the housing 10 when acting as a stop. If the SGRM is controlled by a corresponding polyphase voltage, it displaces its armature 4 toward the workpiece 1, releasing the stop plate 17 from the end face 18 and the spring 14 is compressed. After passing through a certain setting path, the stud holder 3 with the weld stud 2 adopts an intermediate position shown in a dotted line in FIG. 1 before the weld stud 2 contacts the workpiece 1 to strike a welding arc in a known manner by such contact. After ignition has occurred, the armature 4 is moved away from the workpiece 1 by corresponding control of the SGRM, the welding arc being maintained at the necessary intensity in order to produce, on the workpiece 1, a melt into which the weld stud 2 dips due to corresponding control of the SGRM. To produce the welding arc, a suitable voltage should be applied in a known manner to the stud holder 3 and the workpiece 1. These are known measures.

The use of the SGRM allows the axial to and fro movement of the weld stud 2 to be controlled in a defined manner with respect to adjustment and speed, producing optimum conditions for the welding of weld stud 2 and workpiece 1. The main factors are, in particular, the speed at which the weld stud 2 strikes the workpiece 1, the lifting of the weld stud 2 from the workpiece 1 and finally the speed of immersion of the weld stud 2 into the melt on the workpiece 1, the depth of immersion of the weld stud 2 into the melt also being precisely adjustable.

The control system used for this purpose is described hereinafter.

As already mentioned at the outset, the SGRM allows rapid and very accurate adjustment of its movable member by control with a frequency-variable m-phase voltage, for which purpose a known frequency converter of suitable power is used. Depending on the frequency of the m-phase voltage applied the stator 11 of the SGRM 5 produces a rotating field which imposes on the armature 4 of the SGRM 5 a defined axial movement owing to the known properties of the armature 4 of the SGRM 5 (reluctance principle). When the rotating field is stationary (frequency zero) the armature 4 is held in axial position. The control system for this control of the SGRM 5 comprise a frequency converter 19 which supplies a corresponding 3-phase voltage of specific frequency to the windings 12 of the stator 11 via three supply lines 20. The frequency converter 19 receives the energy required for it from a power supply unit 21. The frequency to be delivered by the frequency converter 19 at each stage is predetermined digitally by a computer 22 which is programmable according to weld stud, workpiece and other conditions and transmits digital signals to the frequency converter 19, by means of which the frequencies to be delivered by the frequency converter 19 are adjusted in a controlled sequence. This control of a frequency converter by means of a computer is a known technique. Depending on the programming of the computer 22, the computer 22 ensures that the weld stud 2 performs the correct movements of the desired length and necessary speed for the welding process.

Figure 2:
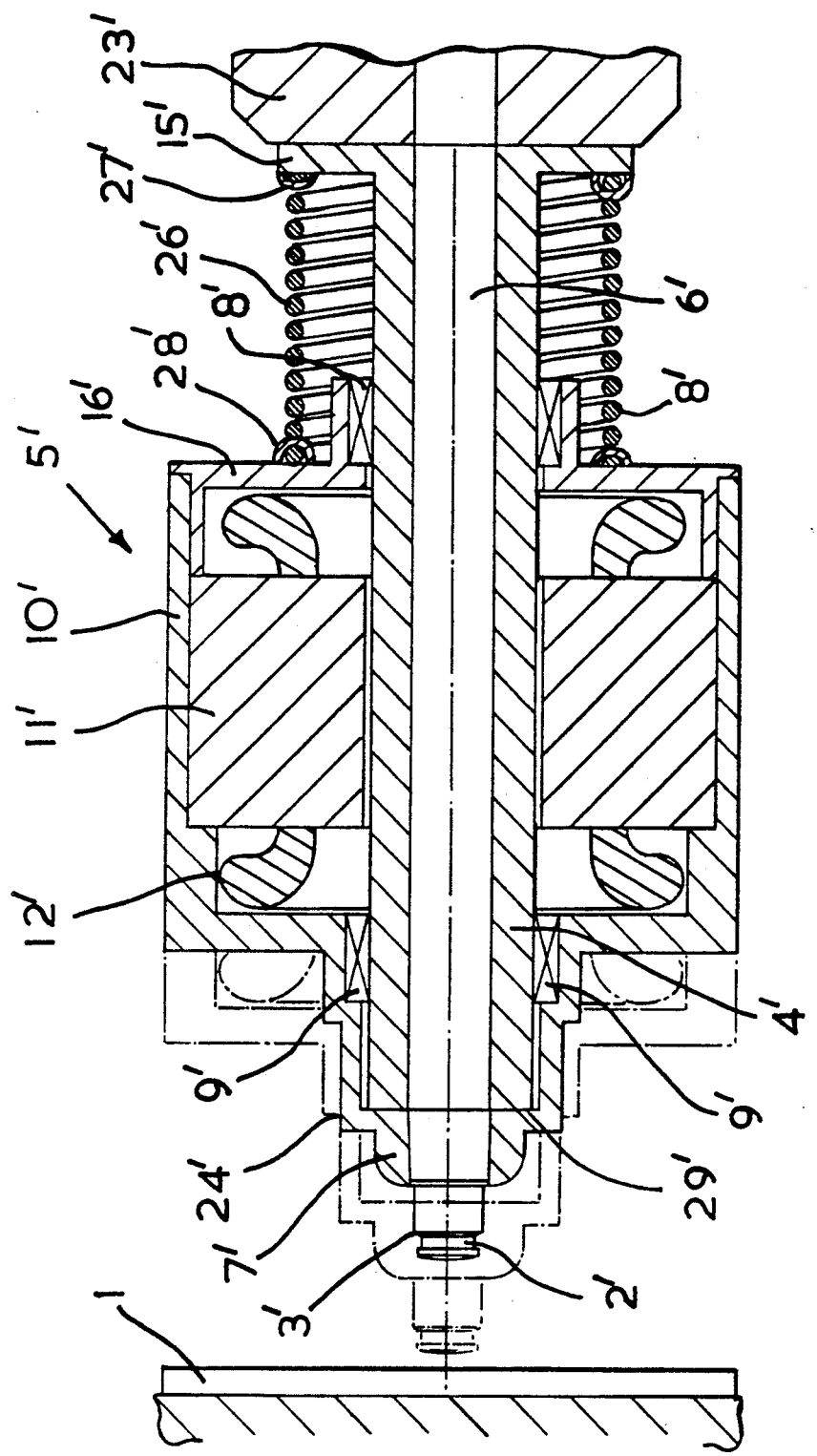
FIG. 2 shows diagrammatically a stud welding device utilizing a SGRM, with a stator forming a moving member of the device.

The stud welding device shown in FIG. 2 basically contains the same components as the stud welding device according to FIG. 1. In the embodiment according to FIG. 2, however, a stator 11' which supports a stud holder 3' provides a movable member as an armature 4' is fastened via a flange 15' on a frame member 23' on its side remote from a stud holder 3'. The armature 4' thus acts as a mounting for the stud welding device.

An inwardly drawn flange 24' at a forward end of a housing 10' forms a stop for the movement of the stator 11' here and moves with the housing 10' during the movement of the housing 10' and, in a rest position, rests against a fixed end face 29' of the armature 4'. In this rest position, a spring 26' pulls the housing 10' with the stator 11' against the stop formed in this way, i.e. the spring 26' is a tension spring, which is suspended on the flange 15' by a clamp 27' and on a radial wall 16 of the housing 10' behind by a clamp 28'.

With suitable control of the stator 11', which has to be carried out by flexible supply lines in this case, the stator 11' is moved with the housing 10' toward the workpiece 1.

In the embodiment shown in FIG. 2, the stud holder 3' is fastened on the inwardly drawn flange 24', more specifically via a receiving part 7' which is rigidly connected to the inwardly drawn flange 24'. Thus when the stator 11' moves toward the workpiece 1 by supply of voltage of appropriate frequency to windings 12', of the stator a displacement is produced which is indicated in the dotted lines in FIG. 2.

The explanations of FIG. 1 can be referred to with respect to the remaining operation and control of the SGRM 5 according to FIG. 2. The SGRM 5 according to FIG. 2 is controlled in the same manner and with the same constructional elements as explained in conjunction with FIG. 1.

We claim:

1. A stud welding device comprising a stud holder and a movable member which moves the stud holder 3 axially to carry a stud into position for welding, in which the movable element is moved by an adjustable linear motor characterized in that the adjustable linear motor is a helical thread reluctance motor (5,5') having an armature (4,4') and a stator (11,11')

the movable element is provided by one of the armature (4) and the stator (11')

the other of the armature (4') and the stator (11) provides a stationary member of the device, and the linear motor and the stud holder are rotationally symmetrical.

2. Stud welding device according to claim 1, characterized in that the movable member is formed by the armature (4), which is arranged inside the stator (11) and is designed in the form of a plunger, and the Stator (11) of the SGRM provides the stationary member.

3. Stud welding device according to claim 1, characterized in that the movable member is formed by the stator (11') and the armature (4') of the SGRM provides the stationary member.

4. Stud welding device according to claim 1, characterized in that the armature (4,4') is constructed as a hollow shaft.

5. Stud welding device according to claim 1, characterized in that the movable member (4,11') in its rest position is urged by a spring (14, 26') against a stop (18, 29) connected to the stationary member.

6. Stud welding device according to claim 1 characterized in that the stationary member (4',11) is fixed to a support.

* * * * *